(12) United States Patent
Stuckert

(10) Patent No.: US 11,779,876 B2
(45) Date of Patent: Oct. 10, 2023

(54) COMBINED THERMAL ENERGY STORAGE AND CONTAMINANT REMOVAL

(71) Applicant: Nicholas Stuckert, Grand Island, NY (US)

(72) Inventor: Nicholas Stuckert, Grand Island, NY (US)

( * ) Notice: Subject to any disclaimer, the term of this patent is extended or adjusted under 35 U.S.C. 154(b) by 150 days.

(21) Appl. No.: 17/329,354

(22) Filed: May 25, 2021

(65) Prior Publication Data
US 2021/0370223 A1 Dec. 2, 2021

Related U.S. Application Data

(60) Provisional application No. 63/029,929, filed on May 26, 2020.

(51) Int. Cl.
*B01D 53/04* (2006.01)
*B01J 20/18* (2006.01)
*B01J 20/32* (2006.01)
*B01J 20/34* (2006.01)

(52) U.S. Cl.
CPC .......... *B01D 53/0462* (2013.01); *B01J 20/18* (2013.01); *B01J 20/3204* (2013.01); *B01J 20/3483* (2013.01); *B01D 2253/108* (2013.01); *B01D 2253/25* (2013.01); *B01D 2253/304* (2013.01); *B01J 2219/0015* (2013.01)

(58) Field of Classification Search
CPC .. B01D 53/02; B01D 53/047; B01D 53/0462; B01J 20/18; B01J 20/3204; B01J 20/3483
See application file for complete search history.

(56) References Cited

U.S. PATENT DOCUMENTS

2008/0148937 A1* 6/2008 Rege .................... B01D 53/047
95/96

OTHER PUBLICATIONS

Han, Hui et al. Fuel 186 (Sep. 2016) 750-757 (Year: 2016).*

* cited by examiner

*Primary Examiner* — Sharon Pregler
(74) *Attorney, Agent, or Firm* — Stadler IP Law PLLC

(57) ABSTRACT

A gas separation process in which the thermal storage of the heat in the gas is desired as well as the gas separation. This invention outlines a novel process and system whereby the thermal storage efficiency can be vastly increased by matching the gas sorption fronts and the thermal fronts to cause thermal front sharpening. The gas separation process and system include an adsorption vessel having an adsorbent in an amount of 10-40% and a thermal storage component in an amount of 50-90% by volume.

5 Claims, 3 Drawing Sheets

COMBINED THERMAL ENERGY STORAGE AND CONTAMINANT REMOVAL

CROSS-REFERENCE TO RELATED APPLICATIONS

This application claims priority to U.S. Provisional Application having Ser. No. 63/029,929, filed on May 26, 2021, the entire disclosure of which is hereby incorporated herein by reference.

FIELD OF INVENTION

This invention is directed to a method and system for thermal energy storage. The method and system also provides for contaminant removal.

BACKGROUND OF INVENTION

The handling of contaminants (such as water and carbon dioxide) during the condensation of air has long been a source of investigation and development. If the temperature in the process drops below the freezing or sublimation point of the contaminant, solids can build up and block the process. This has historically proven to be a very unsafe condition and the result of many air separation plant explosions. The invention of zeolites for the removal of carbon dioxide and water was one of the major breakthroughs in air purification and zeolites are now the most ubiquitous method used to purify air in industrial gas separations.

Processes to remove contaminants from air with zeolites have almost always been batch/cyclic processes rather than continuous processes. Because of the integration with continuous down stream distillation processes, many concessions and developments to improve this integration were designed into the current state of the art systems. A few being the addition of thermal storage medium to the adsorbent to handle adverse heating of the adsorbent bed (U.S. Pat. No. 6,284,021), rapid pressure swing adsorption (PSA) cycling (U.S. Pat. No. 6,231,644), rapid temperature swing adsorption (TSA) cycling and multi-bed variations of these (U.S. Pat. No. 7,179,324).

Recently, the liquefaction of air has been proposed and developed for the storage of energy. The current designs of these storage systems rely on air purification designs that were targeted toward integration with continuous processes (European Patent No. 1,989,400). In order to make this feasible, many unit operations are included to convert from processes that are steady state (compression and heat removal) to those that are inherently batch processes that have been optimized for integration with steady state processes (contaminant removal with adsorbents) back to steady state processes (heat removal and expansion) and finally to a batch process (storage). This ends with a batch process because energy storage is inherently a batch process that relies on a charging/discharging cycling. In light of this, it no longer makes sense to use a contaminant removal process that was designed to make continuous air purification possible, when we can convert the entire system to a single batch process with a single cycle time. This saves dramatically on energy losses since each cycle that occurs for a batch process represents a significant loss in energy and therefore overall efficiency.

In the following, the relevant patents to improve such systems are summarized briefly:

For example, U.S. Pat. No. 5,156,657 A discloses an improved PSA process for the pre-purification of air to remove water vapor and carbon dioxide prior to introduction into an air separation unit. The subject process includes a step of efficiently regenerating the adsorptive beds utilized to remove the impurities wherein they are first vented to the atmosphere, then evacuated with atmospheric venting and finally purged under evacuation. Preferably, a pair of adsorptive beds operating out of phase undergo top and bottom pressure equalization prior to backfilling of the bed completing regeneration.

Another example, U.S. Pat. No. 10,646,816 discloses a method to improve the pre-purification process by adding thermal storage material to a traditional carbon dioxide removal part of the adsorbent bed. It is noted that addition of this thermal storage material does not positively impact the removal of water in the water removal part of the adsorbent bed. Additionally substantial benefits are obtained not from thermal management but from increased kinetics of adsorption.

Also, European Patent No. 1,989,400 provides a method of storing energy comprising: providing a gaseous input; producing a cryogen from the gaseous input; storing the cryogen; pumping the cryogen to a form a pressurized cryogen; heating the pressurized cryogen in a first heat exchanger using heat from the gaseous input; superheating the heated pressurized cryogen in a second heat exchanger using heat from the gaseous input; expanding the superheated cryogen through a turbine to drive the turbine; and recovering cold energy by recycling at least a portion of the cold energy contained in the cryogen by extracting said cold energy through said first and second heat exchangers to cool down the gaseous input, thereby using the recovered cold energy to enhance production of more cryogen.

A minimum viable storage system for compressed air must consist of a storage tank. Compressed air is typically at high temperature from initial compression which leads to low storage volumes and thus low utilization and higher cost. Ambient air cooling is now standard for all compressed air storage systems. Unfortunately, this heat is rejected to the environment and lost as a potential source of energy when attempting to recover the energy stored in the compressed air. Heat storage has been developed as a method to increase the efficiency for compressed air storage and the state of the art consists of direct contact with a fluid (U.S. Pat. No. 8,763,390). Other systems that use gravel or crushed rock (Japan Patent No. 5,671,548) are usually designed to minimize pressure drop, dusting/degradation, cost, and thermal diffusion/conduction while maximizing thermal storage capacity. Thus, any solid material that meets this criteria would be considered a viable candidate.

SUMMARY OF THE INVENTION

In light of the above, it is an object of the present invention to overcome or at least alleviate the shortcomings of the prior art. More particularly, it is an object of the present invention to store the heat or lack of heat relative to ambient conditions, particularly the heat released during compression and removed during expansion processes. Furthermore, the heat is stored in a manner that it can be used later.

A novel method that is presented here to increase this efficiency is the consideration of the addition of materials that can adsorb contaminants directly to the thermal storage components. As adsorbents uptake gas species, heat is released. At higher temperatures, adsorbents adsorb heat and release the gas that was previously adsorbed. If this is done in what has been called a "favorable" manner or isotherm, this will result in a concentration front that moves through the bed with increasing sharpness. If this is "neutral" or "unfavorable", this front will disperse as it moves through the bed. The more disperse the front, the lower utilization of the adsorbent bed and the higher the overall cost. This is why adsorbents with highly favorable isotherms are used at the end of the adsorption bed to sharpen the adsorbent front. Thermal storage mediums can be considered to have a fundamentally similar heat uptake characteristic as neutral isotherms. Thus, as the gas moves through the bed, the heat front disperses. Since adsorption and the heat in the bed are intrinsically linked, improving one will improve the other. A bed that has a very sharp contaminant front can help to substantially sharpen the thermal front.

This is then a very large step towards enabling further cooling of the gas. Once contaminants are removed, then the gas can be cooled below their condensation/sublimation temperature, and since the cooling can be done with the same medium as before (prior to or during the contaminant removal), a single bed can cool the gas to complete condensation with the proper layering structure of adsorbent and thermal storage medium. However, it is not obvious what this layering could be and further it is not obvious how one would be able to start the system when all the thermal storage medium begins at ambient temperature. To get around this, systems have been designed with 5 unit operations (European Patent No. 1,989,400) instead of the single unit operation proposed in this invention.

The design of an integrated adsorption and thermal storage system is bounded by two extremes. The first and most obvious, is insufficient amount of adsorbent. In this case, the limitation is no adsorbent and it's clear that there would be no advantage over existing systems that currently have no adsorbent. The second and less obvious, though still apparent to an expert in the field, is too much adsorbent and too little thermal storage. At this point, it would be natural to assume this would result in the sharpest possible front. However, if there is too much adsorbent, the contaminant front will be substantially behind the thermal front. All adsorbents still retain some capacity at elevated temperatures, and therefor the thermal front will diffuse through the bed with no sharpening of the thermal front and substantial loss in thermal capacity. Because of these two truths, it has never been obvious that there is a middle ground at which there are benefits to thermal storage. However, if the amount of contaminant and properties of the adsorbent are used to calculate the amount of adsorbent required to maintain a contaminant front that is close in natural propagation to the thermal front, sharpening of the thermal front can and will occur.

This invention then fully completes the shift of cryogenic energy storage from a process adapted from a steady state process to a process designed intentionally as a batch process from the ground up. The present invention is a single integrated cycle. Although a single adsorption vessel is preferred, adding another adsorption vessel provides similar advantages. The process is capable of reducing the capital expenditure of the system by 90% when compared to the prior art systems.

In one embodiment, a gas separation system comprises: at least one adsorption vessel; a compressor/expander; a three way valve; a valve; a four way valve; a turbo expander; a storage tank; 3-70% by volume of at least one adsorbent, including sorbent voids and sorbent packing voids; and 30-97% by volume of at least one direct contact thermal storage component, including thermal storage voids and thermal storage packing voids.

In another embodiment of the gas separation system, the volume of the at least one adsorbent is 10-70% by volume and the volume of the at least one thermal storage component is 30-90% by volume. In a further embodiment, the volume of the at least one adsorbent is 10-40% by volume and the volume of the at least one thermal storage component is 60-90% by volume.

In one embodiment, a gas separation process comprises the steps of:

feeding, at a flow rate, a gaseous mixture comprising at least two components having different adsorption characteristics into at least one adsorption vessel containing at least one adsorbent capable of preferentially adsorbing at least one of the gaseous components in the gaseous mixture and at least one thermal storage component;

subjecting the gaseous mixture to conditions which enable the preferentially adsorbable gaseous component in the gaseous mixture to adsorb onto the at least one adsorbent;

separating from the non-adsorbed component in the gaseous mixture which passes through the at least one adsorbent vessel, wherein at least one adsorbent material in the at least one adsorbent vessel comprises:

3-70% by volume of the at least one adsorbent, including sorbent voids and sorbent packing voids;

wherein at least one thermal storage component in the at least one adsorbent vessel comprises:

30-97% by volume of the at least one thermal storage component, including thermal storage voids and thermal storage packing voids;

wherein the process typically requires a purge flow rate greater than 70% of the feed flow rate;

charging the at least one adsorption vessel with a compressor to full pressure;

expanding a resultant stream from the adsorption vessel into a storage tank until the storage tank is full;

depressurizing the thermal storage and contaminant removal system fluid through the hot side of the at least one adsorption vessel which may or may not be used to generate electricity; and expanding the process fluid of the storage tank into the thermal storage and contaminant removal system and exits through the hot side of the at least one adsorption vessel which then may or may not be used to generate electricity.

In another embodiment of the gas separation process, the volume of the at least one adsorbent is 10-70% by volume and the volume of the at least one thermal storage component is 30-90% by volume. In a further embodiment, the volume of the at least one adsorbent is 10-40% by volume and the volume of the at least one thermal storage component is 60-90% by volume.

DETAILED DESCRIPTION OF THE INVENTION

The term "sorbent" as used herein and in the appended claims is defined as a material that can selectively adsorb one component from at least a two component mixture and includes the particle and packing voids. The term "sorbent" is used interchangeably with the term "adsorbent".

The phrase "thermal storage component" or "thermal storage material" as used herein and in the appended claims is defined as a material that has a relatively higher volumetric material heat capacity than typical of sorbents and includes the particle and packing voids.

Figure 1:
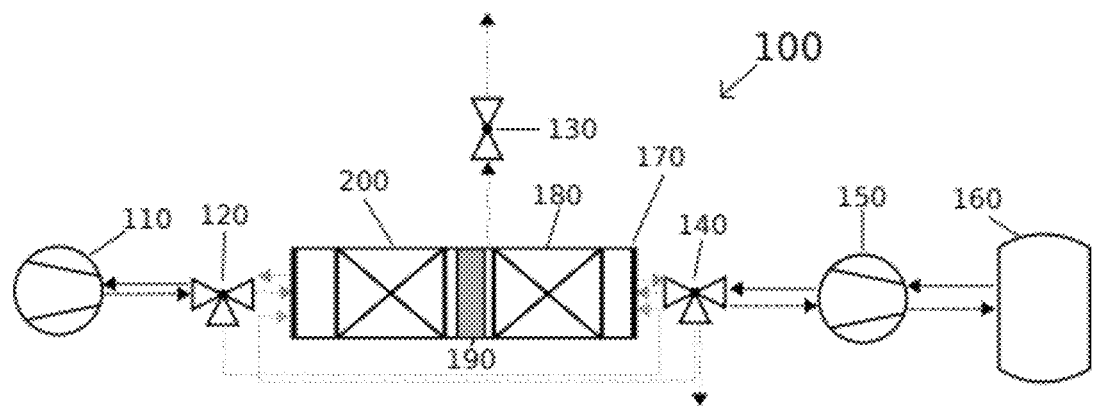
FIG. 1 depicts a potential layering scheme for this invention and an arrangement of this invention as part of a complete energy storage system.

As seen in FIG. 1, the system for thermal energy storage and contaminant removal 100 includes compressor 110, three way valve 120, valve 130, four way valve 140, turbo expander 150, storage tank 160, adsorption vessel 170, thermal storage component 180, and adsorbent 190. It is noted that compressor 110 can also function as an expander.

Figure 2:
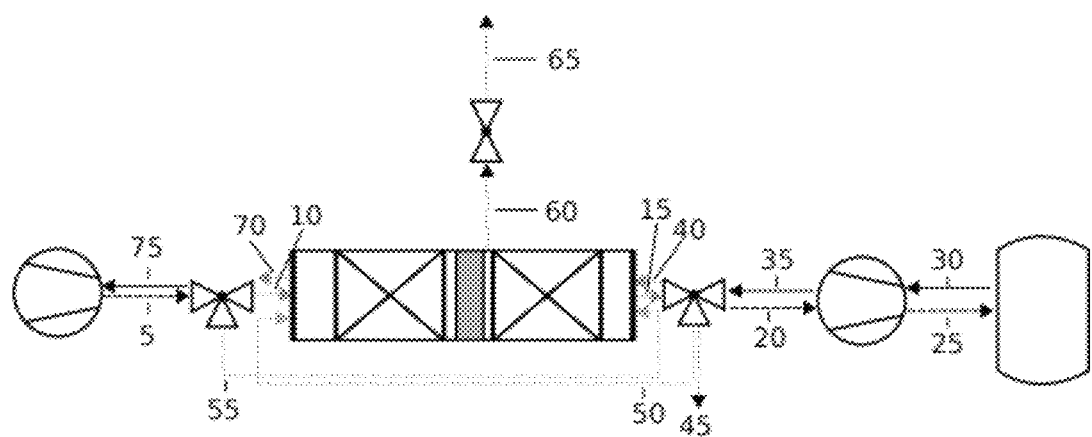
FIG. 2 depicts flow through a system.

As shown in FIG. 2, a process for thermal energy storage and contaminant removal includes feeding 5 a gaseous mixture comprising at least two components having different adsorption characteristics from compressor 110 into three way valve 130. Resulting stream 10 is fed into adsorption vessel 170. Resulting stream 15 is fed into four way valve 140 and resulting stream 20 is fed into turbo expander 150 with resulting stream 25 fed into storage tank 160. Resulting stream 60 from adsorption vessel 170 is fed into valve 130 and resulting stream 65 is released as waste 65. Flow path 70 is directed to valve 120 which is then fed to the compressor/turbine 110 via flow path 75 in order to generate kinetic energy which could be converted to electrical energy with an alternator/motor. Valves 120 and 140 together with flow paths 50 and 55 can be used to provide counter current flow to the adsorption vessel which in some operating modes would be useful to maximize the storage capacity of the system or enable the replication of different adsorption purging/regeneration cycles.

Figure 3:
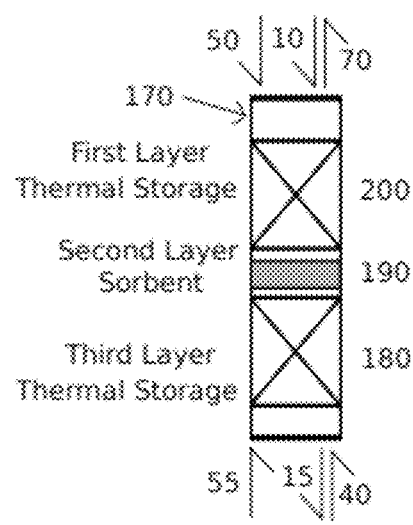
FIG. 3 depicts a potential layering scheme of an adsorption vessel.
Figure 4:
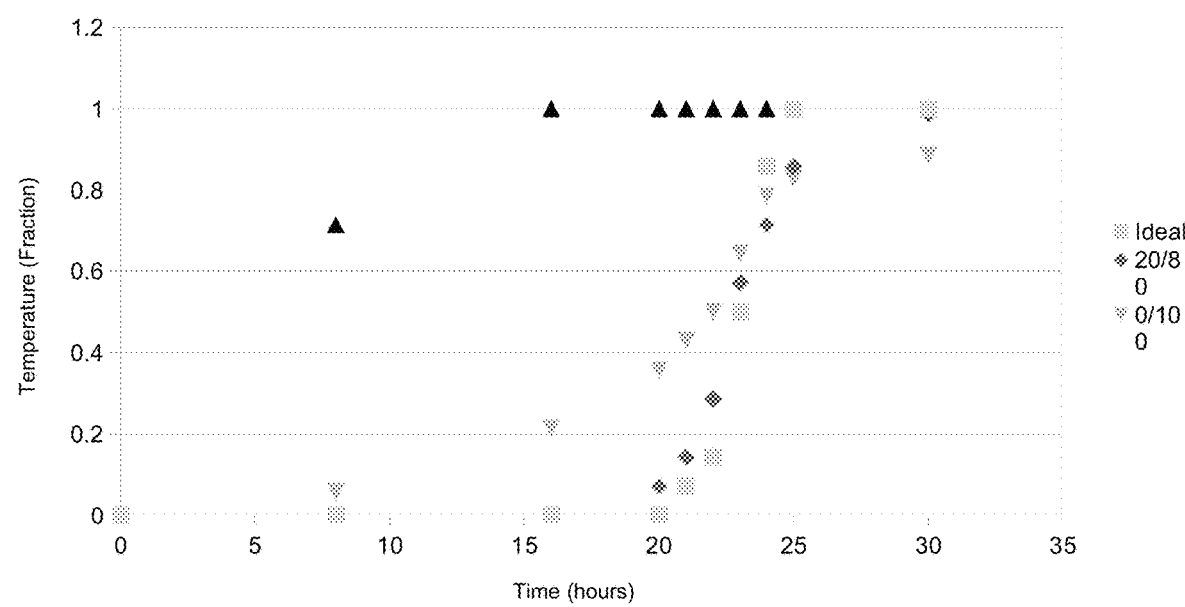
FIG. 4 depicts the breakthrough performance of the different tests (20/80 label represents case 1 of example 1, 0/100 represents case 2 of example 1 and 90/10 represents case 3 of example 1) of the combined thermal store and the match to the expected performance from the modeling (Ideal) as a fraction of the exit temperature compared to steady state exit temperature. X axis is time in hours.

FIG. 3 depicts layers of thermal storage material 180 and 200 located on either end of adsorption vessel 170 and a layer of sorbent material 190 is located in between thermal storage material layers 180 and 200. Although FIG. 3 depicts an embodiment with distinct layers of adsorbent and thermal storage component, it is understood that an embodiment without distinct layers of adsorbent and thermal storage material is within the spirit of the present disclosure.

In order to maximize the benefit from the invention the following must be determined:

Thermal front spreading of the thermal storage components and particle size selection
  Adsorbent type required
  The amount of thermal storage component required
  Adsorbent capacity and amount required
  Purge requirements
  Regeneration process
  Startup method 1) Thermal front spreading is the primary unknown in the sizing process. Thermal front spread can be reduced by decreasing particle size of a direct contact thermal store at the expense of increased pressure drop. Since pressure is the primary product being stored, this is highly undesirable. Changing aspect ratios of the thermal store can also affect the spreading of the thermal front but only when heat transfer at the surface is the substantially limiting factor. This does not typically occur until particle sizes are below 0.5 mm.

Thermal front spreading is caused by gas diffusion, thermal conduction through the thermal store and the resistance of thermal conduction into the particle used in the thermal store:

$$\text{thermal front} = f(k, v, k_{gas}, r_{particle})$$

Where:
$k$ = thermal diffusivity of particle
$k_{gas}$ = thermal diffusivity of gas
$v$ = velocity of gas
$r_{particle}$ = radius of the particle
$cdf$ = conduction degradation factor In a packed bed of spheres the characteristic length of the voids is approximately ⅓ of the particle size. Additionally, the volumetric thermal capacity of a sphere is roughly ⅓*radius of the thickness of a thin plate $$\text{thermal front} \sim = \text{length of bed} * (r_{particle}/3 * (v/k + v/k_{gas}/3))$$

Thermal conductivity is another major source of thermal front spreading (https://www.nist.gov/publications/measurement-heat-conduction-through-metal-spheres).

$$\text{thermal front} \sim = v * (k/(pi * (r_{particle})^{2/3}) + k_{gas}/(pi * (r_{particle})^{2/3})) + (k/v) * cdf$$

As an example, for a bed of 5 meter length using air at 25 C (18 mm2/s), 304ss (4 mm2/s) balls of 0.1 mm diameter, a conduction degradation factor of 0.11 and a velocity of 0.01 m/s the thermal front spreading contribution from thermal resistances in the fluid and the particle are ~2e-5 m.

The system losses are approximated as ⅓ the thermal front/total bed length and ⅔ the pressure drop/total pressure based on a typical polytropic compressor. The optimal particle size for this application will be in the 0.1 to 0.5 mm diameter range. This will vary by application and can be determined as demonstrated. This method will be referenced as the thermal store particle sizing method.

2) The correct selection for the sorbent layer must consider:
  the total amount of contaminant,
  the sorbent capacity for the contaminant and the entire operating range of contaminant partial pressure and temperatures in the system,
  the competing sorption effects from other potential contaminants,
  pressure drop,
  thermal capacity,
  gas diffusion,
  gas sorption kinetic resistances,
  thermal diffusion and thermal conduction,
which are required at a minimum to accurately size the layer. Further potential regeneration benefits from cooling the sorbent with the gas that was previously cleaned should be accounted for to maximize efficiency. Correct selection of the sorbent must also be considered and will be dependent on the application. This method of selection is not taught in this invention but can be sourced from relevant prior art (Mehrotra et al. in a paper titled "Arithmetic approach for complex PSA cycle scheduling," Adsorption (2010) 16: 113-126).

3) The sizing for the thermal store can be done by calculating the mass flow of the feed and desired operating time, relative to the thermal capacity of the particles in the thermal store while also accounting for the thermal front.

Volume of thermal store=($mf$*int($cpf,T1,T2$)/int($cpp, T1,T2$)*time/$p particle$)*(1+thermal front fraction)

Where:
T1=thermal store temperature at the start
T2=process fluid temperature
time=time
pparticle=density of the particles
cpp=the heat capacity of the particles
mf=mass flow rate of process fluid
thermal front fraction=(thermal front+length of thermal store)/length of thermal store
pph2o=partial pressure of contaminant
psorbent=density of the sorbent 4) The basis for the sorbent sizing is then determined by the maximum amount of contaminant allowed into the product stream. This can be done by analyzing the sublimation pressure of the contaminant throughout the system, the tolerance of the system to light buildup of contaminant and periodic cleaning of the system. For example if moisture is the contaminant to be removed from a gaseous mixture and the system drops to 100% relative humidity (R.H.), and we can assume the capacity of the system to be 1 kg of water per meter of pipe, the piping equivalent is 30 m, with a system cleaning once per year and 30 worst case days per year, then 1 kg of water is acceptable per cycle. A calculated contaminant front length and curve and the desired volumetric flowrate can then be used with the predetermined maximum outlet concentration to inform the degree to which the sorbent must purify the process stream. The bypass and contaminant front length and curve can be determined by the method taught by Ralph Yang in "Gas Separation by Adsorption Processes" page 186.

volume of sorbent=$mf$*time*$pph2o$/mass capacity of sorbent/psorbent+contaminant front sorbent sizing factor=volume of sorbent/volume of thermal store Where:
mf=mass flow rate of process fluid
thermal front fraction=(thermal front+length of thermal store)/length of thermal store
pph2o=partial pressure of contaminant
psorbent=density of the sorbent The sorbent sizing factor is defined as the case where the thermal storage is used to 100% capacity and the contaminant level is at the highest case ever anticipated.

The simplified novel sorbent sizing factor for thermal storage and contaminant removal applications is used to determine minimum required sizing for full charging during worst case scenarios. In some scenarios, partial charging may be desirable instead such that this factor could be less than 1. However typically this factor will be close to 1, and will be greater than 0.2 for any operating condition. This factor enables the correct sizing of the combination of a thermal store and sorbent.

5) The primary purge requirement differences between prior art TSA applications and the design basis for this application, are the transient temperature of the process fluid and the very high purge to feed ratio. By "purge" what is traditionally assumed is a portion of the gas that has been previously treated by the sorbent and contaminants have been removed. In the case of the cyclic energy storage system proposed in this invention, a purge to feed ratio >0.7 is typical and >0.9 is more typical, with 1.0 being ideal. The purge however is not provided at elevated temperature as is traditional in a TSA and is not at substantially lowered pressure as is traditional in a PSA. A hybrid PSA/TSA usually involves reduced pressure and increased temperature. The purge proposed in this invention, however, is inverted from that system and constitutes an entirely different class of sorbent systems. A cold high pressure purge substantially reduces efficiency but increased purge to feed ratio means that the benefit should not be discounted.

It should be noted that due to the large purge requirement of this system, it is counter indicated to use this in a continuous process or one in which the process fluid is ultimately required as a product that has substantial contaminant removal or component separation.

6) Processes for sorbent regeneration when required. In the case of a fully integrated vessel containing both the thermal store and the sorbent, co-current hot regeneration can be considered. This is case A. A second case corresponds to separated vessels with valving to accommodate feed of the hot thermal store to either side of the sorbent bed. This is case B. A potential configuration of case A is shown in FIG. 1.

In case A, a hot purge pushes the contaminant toward the product end, thus acting counter to the purge that would follow, and reducing system efficiency. A hot purge would not be optimal if it were required every cycle. At this point, an increase in sorbent layer size should be considered. This increase would allow multiple cycles of contaminant build up during sorption and released during purge to be fully released periodically with a hot purge. This would increase system efficiency since the hot purge requires expelling thermal energy (either through venting or into the second thermal storage layer or into the storage tank). This type of cycle is known in prior art (U.S. Pat. Nos. 6,197,092 and 6,315,817) but this has not been used in a combined thermal store system or in energy storage systems. Further, the purge steps in those systems follows the traditional PSA methodology at pressures substantially below 5% of the product gauge pressure. Here the pressures are at least 5% of the product gauge pressure (with exceptions made during cold charging/startup times) but typically at least 60% of the product pressure.

In a cycle for 3 bar air, at 100% relative humidity and 25 C feed conditions, a silica gel sorbent would lose ~30% of bed capacity per cycle. Because the isotherm is favorable, this leads to slight benefits when using larger bed sizes than typically required (the contaminant front will sharpen cycle over cycle). Since in no real operating scenario will the feed be consistent, the sorbent is then sized for the highest contaminant case such that the bed is optimally sized at 100% of required capacity. This would require a hot purge after every cycle but can then be operated with a periodic purge when process contaminant levels are at typical conditions. One drawback is the requirement to predict the feed conditions for the next cycle. Since capacity for the sorbent could not be sufficient for a worst case if not fully regenerated every cycle, further sorbent can be added at an increased capital cost.

In case B, a partial high temperature purge can be applied as is common in a typical TSA cycle. This can be done at high or low pressure to partially clean the product end of the sorbent. During the reversal of the system, the normally occurring purging can clean the adsorbent completely. This leads to greater flexibility in operating situations without the requirement for increased amount of sorbent.

The development of this novel cycle to address the unique concerns of pressure and thermal energy systems leads to substantial reductions in capital and moderate increases in round trip efficiency. For a typical system, this eliminates the need for a second unit operation and associated vessels, piping, valving and controls.

7) The startup method for a system that uses this invention could be envisioned to be the following:

The first step is to charge the system and remove the maximum amount of heat possible.

1) the thermal storage and contaminant removal tanks were charged with a compressor to full pressure, the process fluid was then expanded into the storage tank until the storage tank was full The second is to fully regenerate the adsorbent.

2) the gas exiting the contaminant removal tank was diverted until the outlet temperature reached steady state The third is to depressurize part of the system.

3) the thermal storage and contaminant removal system fluid was depressurized through the hot side The fourth is to fully discharge the system while removing the maximum amount of heat possible.

4) the process fluid in the storage tank was expanded into the thermal storage and contaminant removal system and exited through the hot side

EXAMPLES

Example 1

A test system was designed and constructed to illustrate the benefits of the addition of adsorption material to a thermal storage system. A 15 gallon air compressor was purchased and the tank was cut open. Inside the tank an 8" bed was constructed with a blocked flow path from the top of the bed to the exit such that the only flow path through the system was through the bed. This bed was layered with:

Case 1) 20% zeolite type A at the bottom near the exit and 80% crushed granite at the top Case 2) 100% crushed granite Case 3) 90% zeolite A at the bottom and 10% crushed granite at the top Around the bed, insulation was used to provide thermal resistance to the tank wall, including the top and bottom of the bed. The tank was then welded shut and pressurized. Once pressurized, the tank was held at a constant pressure of 14 bar, with an inlet temperature of 200 C. The outlet temperature and relative humidity were then monitored for the duration of the test. Ambient temperature and relative humidity were recorded for consistency. The results are displayed in FIG. 2 and Table 1.

TABLE 1

This table shows the performance of the different tests of the combined thermal store and contaminant removal system as compared with the simulated performance and expected performance for a commercial system. Thermal storage capacity was defined as the time the system maintained an outlet temperature of less than 10% of the difference between starting and steady state outlet temperature. The fraction of time from 20% to 80% represents the time it takes to increase from 20% of the difference between starting and steady state temperature to 80% of the difference.

| Sorbent fraction | Thermal storage component fraction | Thermal storage capacity (hours) | Fraction of time from 20% to 80% (hours) | Predicted fraction of time from 20% to 80% (hours) |
|---|---|---|---|---|
| 0 | 100 | 6 | 10 | 8 |
| 20 | 80 | 21 | 1.5 | 1 |

TABLE 1-continued

This table shows the performance of the different tests of the combined thermal store and contaminant removal system as compared with the simulated performance and expected performance for a commercial system. Thermal storage capacity was defined as the time the system maintained an outlet temperature of less than 10% of the difference between starting and steady state outlet temperature. The fraction of time from 20% to 80% represents the time it takes to increase from 20% of the difference between starting and steady state temperature to 80% of the difference.

| Sorbent fraction | Thermal storage component fraction | Thermal storage capacity (hours) | Fraction of time from 20% to 80% (hours) | Predicted fraction of time from 20% to 80% (hours) |
|---|---|---|---|---|
| 90 | 10 | 15 | 10 | 9 |

The increased usable thermal storage capacity of almost 40% was present even while overall thermal capacity (~10%) demonstrating the extremely large benefit of combining thermal energy storage and contaminant removal.

Example 2

Models were built of Example 1 in a steady state process modeling software, and a dynamic process modeling software. These models were built according to industry and academic standards. Results are combined with results from Example 1 in FIG. 2 and Table 1.

Example 3

A model was built to examine the potential if Case 2 from Example 1 was then connected to Case 1 from Example 1, which was then connected to a turbo expander which connected to a cryogenic storage tank. The system was cycled according to the startup method.

After 20 cycles, the system was able to achieve temperatures below −164 C indicating that liquefaction of the process fluid would eventually start occurring.

It will be appreciated by those skilled in the art that while the combined thermal energy storage and contaminant removal has been described in detail herein, the invention is not necessarily so limited and other examples, embodiments, uses, modifications, and departures from the embodiments, examples, uses, and modifications may be made without departing from the process and all such embodiments are intended to be within the scope and spirit of the appended claims.

What is claimed is:

1. A thermal storage process comprising the steps of:
a) feeding a gaseous mixture comprising at least two components having different adsorption characteristics into at least one adsorption vessel having a hot side and a cold side and containing at least one adsorbent capable of adsorbing at least one of the gaseous components in the gaseous mixture and at least one thermal storage component;
b) subjecting the gaseous mixture to conditions which enable the adsorbable gaseous component in the gaseous mixture to adsorb onto the at least one adsorbent; and,
c) separating from the non-adsorbed component in the gaseous mixture which passes through the at least one adsorbent vessel thereby creating a resulting stream;

wherein the at least one adsorbent in the at least one adsorbent vessel comprises:
3-70% by volume of the at least one adsorbent;
wherein the at least one thermal storage component in the at least one adsorbent vessel comprises:
10-97% by volume of the at least one thermal storage component; and,
wherein the process has a purge flow rate greater than 70% of the feed flow rate; and
wherein the purge flow pressure is at least 60% of the resulting stream pressure.

2. The process of claim 1 wherein the at least one adsorbent is selected from the group consisting of activated alumina, porous silica, silica gel, zeolites, mesopore-structured materials, carbon molecular sieve, and mixtures thereof.

3. The process of claim 2 wherein the zeolite is selected from the group consisting of BEA, CHA, EMT, ERI, FAU, FER, GIS, HEU, LTA, LTL, MAZ, MEI, MEL, MFI, MOR, MTW, OFF, TSC, ZSM-2, ZSM-18, ZSM-48, or mixtures thereof.

4. The process of claim 1 wherein the at least one thermal storage component is comprised of at least one of iron, silica, steel, tungsten, zinc, basalt, granite, lead, alumina, aluminum, brass, copper, and bismuth and wherein >10% of the at least one thermal storage component is on the hot side of the at least one adsorption vessel and the remainder of the at least one thermal storage component is on the cold side of the at least one adsorption vessel.

5. The process of claim 1 wherein greater than 95% of the at least one adsorbent particles and greater than 95% of the at least one thermal storage component particles have an average diameter greater than 0.6 mm;
wherein >10% of the at least one thermal storage component is on the hot side of the at least one adsorption vessel and the remainder of the at least one thermal storage component is on the cold side of the at least one adsorption vessel; and
and wherein the process has a purge flow rate greater than 90% of the feed flow rate.

* * * * *